June 30, 1925.

G. W. BENTON 1,543,746

MACHINE FOR MAKING HANDLE GRIPS

Filed Oct. 17, 1923

INVENTOR.

George W. Benton

BY

Ray Oberlin + Ray

ATTORNEYS

June 30, 1925.  
G. W. BENTON  
1,543,746  
MACHINE FOR MAKING HANDLE GRIPS  
Filed Oct. 17, 1923  
5 Sheets-Sheet 4

INVENTOR.  
George W. Benton  
BY  
Ray, Oberlin & Ray  
ATTORNEYS

June 30, 1925.

G. W. BENTON

1,543,746

MACHINE FOR MAKING HANDLE GRIPS

Filed Oct. 17, 1923

INVENTOR.
George W. Benton
BY
Fay, Oberlin & Fay
ATTORNEYS

Patented June 30, 1925.

1,543,746

UNITED STATES PATENT OFFICE.

GEORGE W. BENTON, OF CONNEAUT, OHIO.

MACHINE FOR MAKING HANDLE GRIPS.

Application filed October 17, 1923. Serial No. 669,055.

*To all whom it may concern:*

Be it known that I, GEORGE W. BENTON, a citizen of the United States, and a resident of Conneaut, county of Ashtabula and State of Ohio, have invented a new and useful Improvement in Machines for Making Handle Grips, of which the following is a specification, the principle of the invention being herein explained and the best mode in which I have contemplated applying that principle, so as to distinguish it from other inventions.

The present improvements, relating, as indicated, to machines for making handle grips, have more particular regard to the manufacture of wooden grips for so-called split D-handles which are formed by splitting or sawing longitudinally for a suitable distance the end of the handle proper, then bending apart the arms formed by the split and securing a transverse grip between such arms. As in the case of the improved form of such handle shown and described in U. S. Patent No. 1,443,863, issued to me under date of January 30, 1923, such grip is desirably thus secured in place by means of a tie rod or rivet that passes therethrough and the adjacent portions of the arms, and metallic reinforcements are applied over the latter and interlocked with the grip in such fashion as to make the handle extremely rigid and durable.

While in my aforesaid patent the grip there shown is of general cylindrical form, or at least symmetrical about its axis, it is desirable as a matter of practice to have such grip curve outwardly in the plane of the arms between which it is secured just as in the case of the grip in the familiar solid D-handle.

The present improved machine accordingly has as one of its objects to turn from the rough a handle grip of curved form but circular cross-section such as just described, it being noted that the ends of such grip are required to lie in approximately parallel planes. A further object is to form the ends of such a grip with recesses adapted to engage with a metallic reinforcement of the type shown in my aforesaid patent and of course the grip requires to be drilled longitudinally for reception of the tie rod or rivet. The machine is designed to perform the foregoing several operations in an automatic manner and at the same time produce grips with great uniformity so that they may be assembled with the other parts, that enter into the completed handle, without any special fitting being required. To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 6 is an elevational view and Fig. 7 a plan view of still another detail feature; and Fig. 8 is a perspective view of the block from which the handle grip is turned with a phantom showing of the finished handle.

Figure 1:
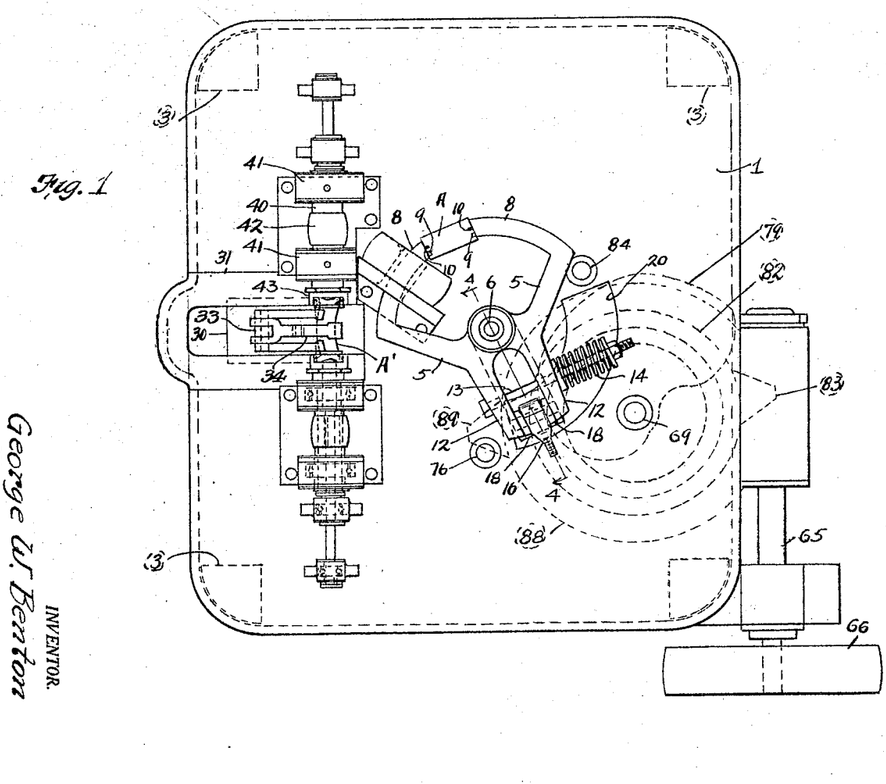
Fig. 1 is a top plan view of a machine embodying my present improvements.
Figure 2:
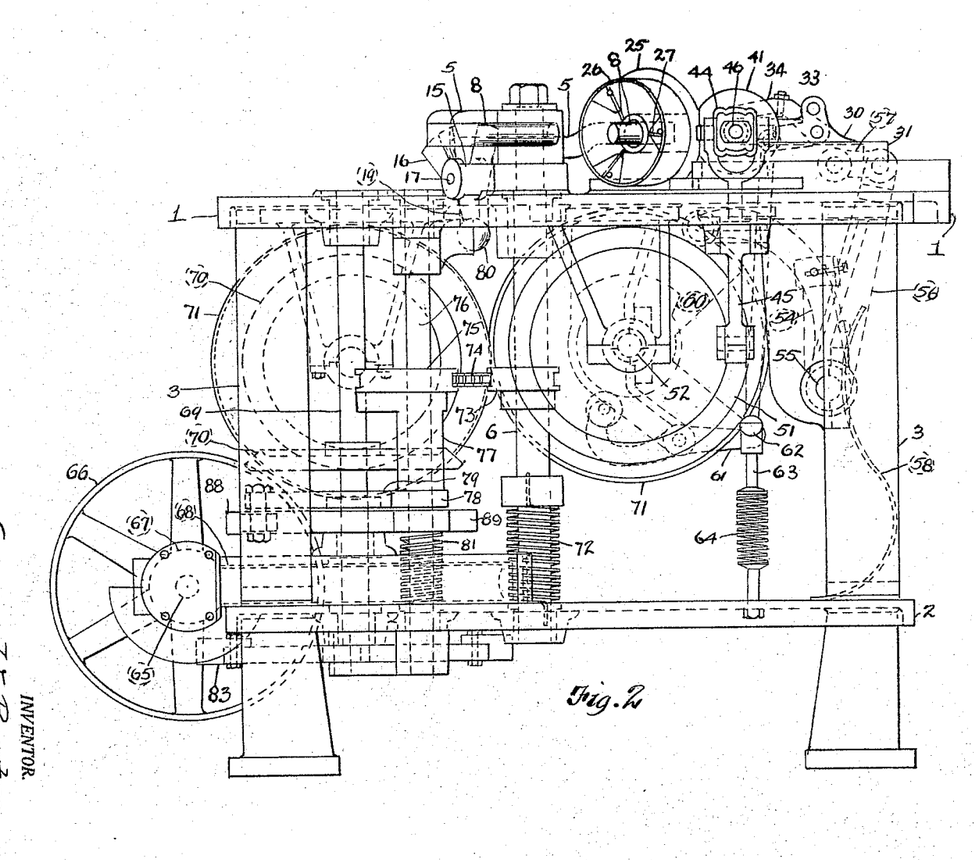
Fig. 2 is an elevation of such machine, viewing the same as from the top of Fig. 1.
Figure 3:
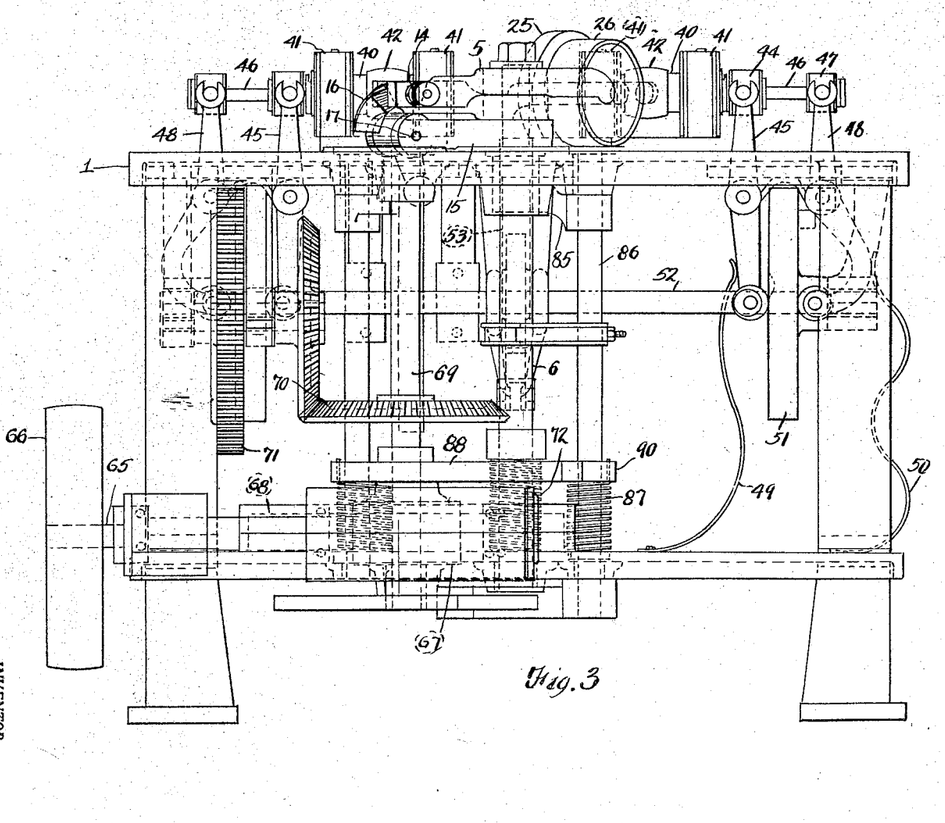
Fig. 3 is another elevational view thereof, viewing same as from the right in Fig. 1.
Figures 6, 7, 8:
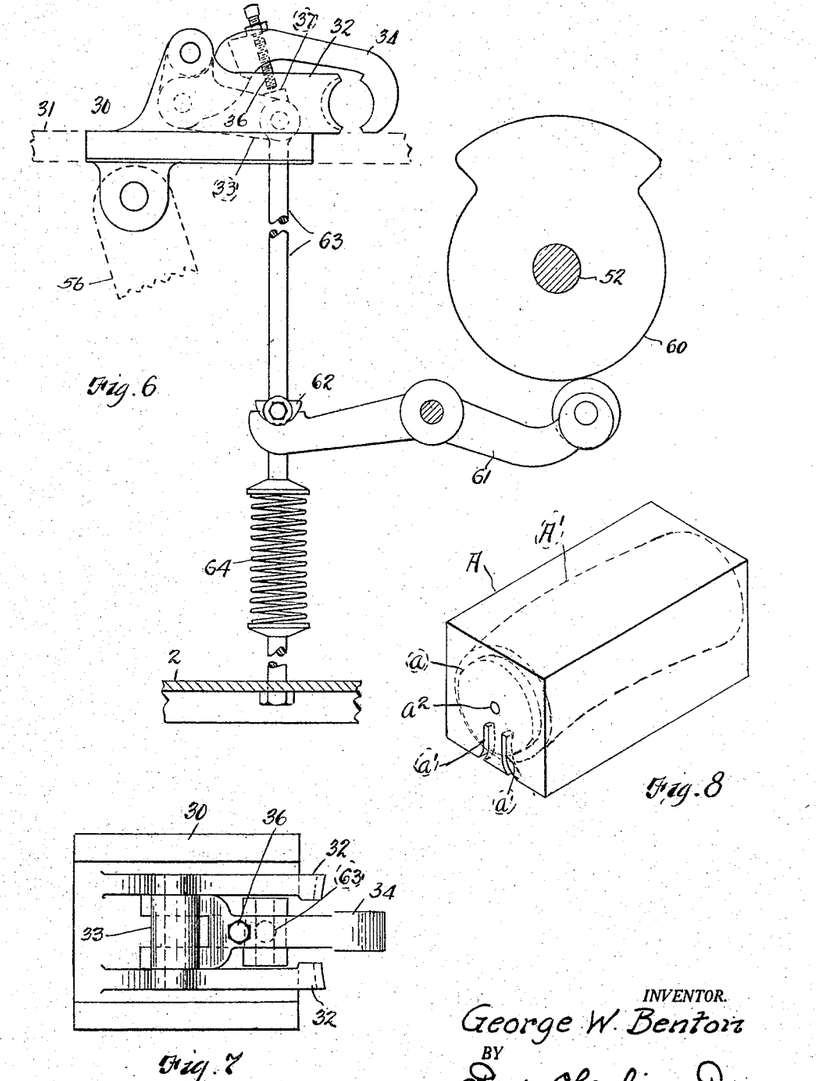

As shown in Figs. 1, 2 and 3, the frame of the machine comprises two vertically spaced horizontal plates 1 and 2 of general rectangular form, such plates being supported in properly spaced relation by four legs 3, one at each corner. The mechanism for actually producing the handle grips is all mounted on such upper plate 1, while the gearing for driving and timing the operation of such mechanism is in the main supported between the two plates, although as will be presently explained, certain elements of such mechanism are driven independently from shafting or motors (not shown) that will be most conveniently located above the top plate 1. The operating mechanism will be first described and then the aforesaid gearing whereby the operation of such mechanism is controlled and the movements of the various parts properly correlated. The rough blocks A of wood from which the handle grips A' are to be formed, as shown in Fig. 8, are of general rectangular form but it will of course be understood that such blocks may be of any shape so long as they are of the proper size to permit the handle grip to be turned therefrom. The length of the blocks, however, will be the same as that of the grips and such ends will furthermore lie in parallel relation. As previously explained, the grips require to have such ends formed with recesses for engagement with certain metallic reinforcements of special design, such recesses comprising an encircling recess $a$ adapted to receive the cupped portion of the reinforcing element so that the latter may lie flush with the surface of the adjacent portion of the grip, and two arcuate recesses $a'$ that extend inwardly from such recess $a$ in symmetrical relation to a radial line and are adapted to receive corresponding arcuate hooks or spurs forming a part of such reinforcing element.

The blocks A are conveniently brought to the position in which one such block is shown in Fig. 1 by means of a chute (not illustrated) or other form of automatic conveyor which is adapted to present successive blocks to a suitable gripping and transfer device. The latter consists of two similar gripper arms 5 mounted so as to be both independently and conjointly oscillatory upon a vertical shaft 6 that is journaled in the two plates 1 and 2 of the frame and rises a suitable distance above the top plate 1. Each of said grip arms 5 is provided at its forward end with an inwardly directed arcuate extension 8, the curve of such extension having the shaft 6 as its axis. The oppositely directed ends of these extensions 8 are adapted upon closing of the arms 5 to press against the corresponding ends of block A and are formed with raised lugs 9 that correspond with the arcuate slots $a'$ so that the closing of the grip arms serves to form such slots in the block A while the lugs at the same time, by thus engaging with the blank, securely lock the latter against rotative movement with respect to the arm extensions 8. The ends of the latter are also desirably provided with centrally located projecting pins 10 that are adapted to form centering holes $a^2$ in the respective ends of the blank in order to guide the drills which subsequently operate upon the blank and longitudinally pierce the same for reception of the tie rod or rivet hereinbefore referred to.

The grip arms 5 are further respectively provided with rearwardly extending lever members 12 that lie in approximately parallel relation. A bolt 13 passes transversely through said members 12 and projects beyond the one thereof to receive a compression spring 14, the action of which is normally to force said lever members towards each other and thus open the extensions 8 between which the blank A is clamped.

Keyed on shaft 6 directly below grip arms 5 is an arm 15 that projects radially in the same general direction from the shaft as do lever members 12, the outer end of said arm being bifurcated and a segmental cam 16 being oscillatorily held in the fork thus provided by a transverse pin 17 (see Fig. 4). Such cam lies between the extremities of lever members 12 which are provided with wearing plates 18 of hardened metal for contact with the cam, and the periphery of the latter, as best shown in Fig. 1, is of two different widths viewed in plan. When the narrower portion of such cam lies between plates 18 on lever members 12, the latter will be forced together sufficiently by spring 14 to hold the extensions 8 of the grip arms 5 out of engagement with a blank; but when the wider portion of such cam is thus in engagement with the lever members 12, such extensions 8 will be moved into engagement with the corresponding ends of a blank, if one be in proper place therebetween. Sufficient pressure may be exerted in this way to force the lugs 9 and 10 on the ends of the extensions into the material of the blank and thus firmly grip the latter between the arms 5, as will be readily understood.

Figure 4:
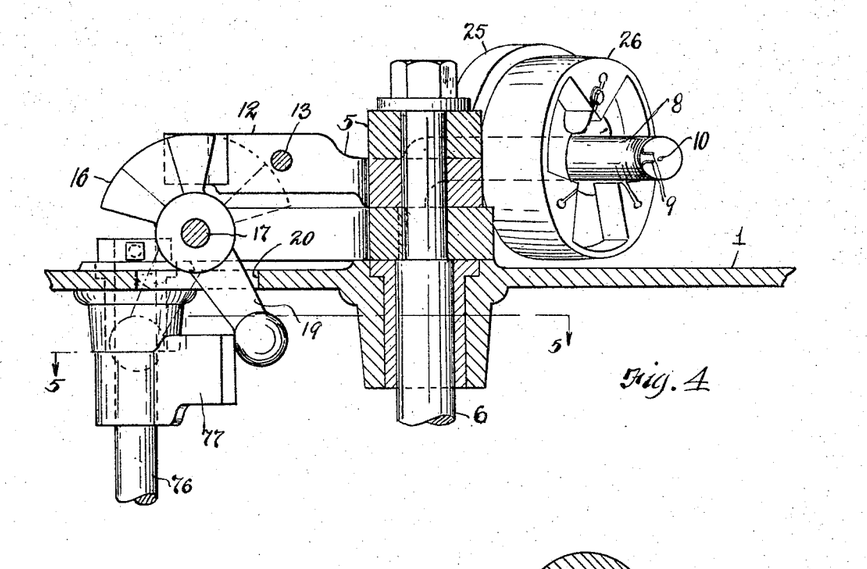
Fig. 4 is a vertical section of one of the operative parts of the machine, the plane of such section being indicated by the line 4—4, Fig. 1.
Figure 5:
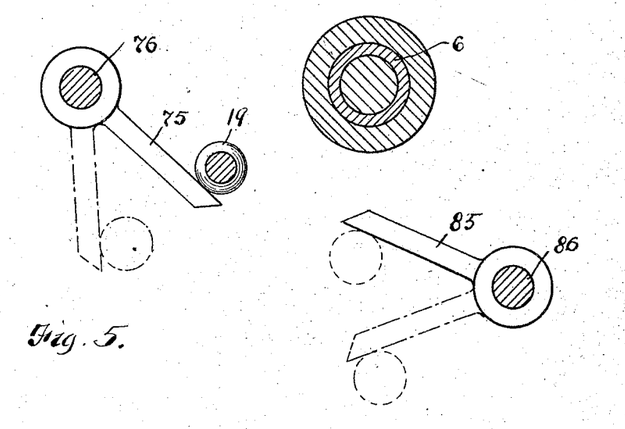
Fig. 5 is a transverse section of another portion of the machine, the plane of the section being indicated by the line 5—5, Fig. 4.

Cam 16 is provided with a downwardly extending arm 19, the extremity of which is preferably rounded, as shown in Figs. 2 and 4, so as to be adapted for engagement with two dogs that are adapted to oscillate said cam to bring first the narrow portion and then the wide portion thereof into engagement with the lever arms 12. These dogs, as will be presently described, are located below the top 1 of the frame and in order to accommodate the end 19 of the cam, as the grip arms 5 oscillate about shaft 6, such top is provided with an arcuate slot 20 (Fig. 1). The dog which throws the wide portion of the cam into operative engagement with the lever members is located adjacent the lower or left-hand end of the slot in the figure in question, while a second dog is located adjacent the upper or right-hand end of the slot. The length of the slot corresponds with the extent of oscillatory movement of the grip arms. Mounted on top 1 in an annular bearing 25 is a pulley 26, the hollow interior of which is provided with a series of inwardly directed cutters 27 so disposed radially as to turn the blank A as it is passed longitudinally therethrough to the desired diameter. The pulley with its cutters is mounted with its axis tangential to the circular path of travel of projections 8 as the grip arms 5 oscillate about shaft 6, and in the position of such arms, as shown in Fig. 1, where the blank A is received and clamped between such projections, the left-hand projection extends entirely through the pulley and beyond the cutters carried thereby. Accordingly, after the blank has been clamped between projections 8, conjoint oscillation of the grip arms in a counterclockwise direction, as viewed in the figure in question, will carry the blank on an arcuate path centrally through the pulley and cutters, with the result that such blank will be turned and given the external form shown in dotted outline in Fig. 8. When the oscillatory movement is completed, the blank will be carried entirely beyond the other side of the pulley and its mounting 25 and such blank presented in proper position to be gripped by the appropriate part of a second mechanism, the function of which is to form the recesses $a$ in the respective ends of the partially completed blank and to drill a hole through the latter for the tie rod or rivet.

The mechanism last referred to, as shown in Figs. 1 and 6, includes a slide 30 reciprocably mounted in a suitable slideway 31 formed in the top 1 of the machine frame, such slideway being aligned with the shaft 6 about which the grip arms 5 oscillate. Slide 30 is formed with two inwardly directed arms 32, the forward faces of which are convexly curved, as shown in Fig. 7, to conform with the convex curve of the partially finished blank; while oscillatorily mounted between said arms 32 is a bell crank lever 33 to which is pivotally attached an opposed clamp member 34 of the form clearly shown in Figs. 6 and 7.

The outer end of this member, in other words, depends downwardly in front and between the forward ends of said arms and its inner face is convexly curved to correspond with the opposite side of the preliminarily formed blank. A set screw 36 extends through member 34 with its inner end disposed to contact with a shelf 37 on the one arm of bell crank lever 33 when such arm is moved upwardly. The initial effect of such upward movement, however, will be to move the outer depending end of clamp arm 34 outwardly with respect to the forward ends of arms 32; thereupon shelf 37 will come into contact with the lower end of said set screw and will turn the clamp arm about its point of pivotal attachment to the bell crank so as bodily to lift such outer depending end thereof entirely above the arms 32.

It will be understood that this is the position of said clamp arm 34 when slide 30 is advanced to receive a preliminarily formed blank from between grip arms 5. Thereupon by pulling downwardly on bell crank lever 33, clamp arm 34 is brought into engagement with such blank and the latter firmly pressed against the outer curved ends of arms 32. Grip arms 5 may now be opened to release projections 8 from engagement with the blank and slide 30 is retracted sufficiently to move the blank clear of such projections 8 and thus leave the latter free to be returned to their initial position.

Properly aligned with the blank in the position which it occupies upon retraction of slide 30 in the fashion just described, are two corresponding lathe heads which are in general of familiar construction. Each includes an outer tubular shaft 40 journaled in longitudinally spaced bearings 41 and provided with a driving pulley 42 intermediate of such bearings. The inwardly directed end of the shaft 40 carries a rotary cutter 43 that is adapted, when moved against the corresponding end of the preliminarily formed blank, to cut the recess $a$ therein. Longitudinal movement of the shaft and thus of the cutter is obtained by means of a yoke 44 on the outer end of the shaft and a shifter arm 45 in the usual way. Reciprocably but non-rotatably held within shaft 40 is a spindle 46 which is adapted to be longitudinally moved by means of a similar yoke 47 and shifter arm 48, such shaft carrying at its inner end a drill (not shown) of suitable length to penetrate somewhat more than half way through the blank A'. The shifter arms 48 for operating the respective drill spindles 46, as will be presently set forth, are arranged to move the latter longitudinally of the corresponding shaft 40 both in the same direction so as not to interfere with each other in the drilling operation.

The two pairs of shifter arms 45 and 48 are oscillatorily mounted in suitable bearings provided therefor on the under side of top 1 and are normally held in advanced position by means of springs 49 and 50, respectively. However, a face cam 51, carried by a horizontal shaft 52 interposed between suitable rollers on the lower ends of each pair of shifter arms, serves to control the advance movement of the shaft 40 carrying cutter 43 and of drill spindle 46 so as to properly time the operation of each. Cam shaft 52 is also utilized to shift slide 30 back and forth and to operate the clamp arm 34 carried by such slide. The shifting of the slide is accomplished through the medium of a disk cam 53 (Fig. 3) on said shaft that contacts with a lever 54 oscillatory about an axis 55 located to the rear of said shaft. Suitably connected to said lever 54 is a second lever 56, the upper end of which is in turn connected with the slide by means of a short link 57. A spring 58 that cooperates with said second lever tends normally to move the slide inwardly so that the function of cam 53 is merely to retract the slide. The operative connections for the clamp arm 34 are best shown in Fig. 6, such connections including a disk cam 60 on shaft 52 that engages with one end of a double arm lever 61, the other end of which engages a bearing block 62 on a vertical rod or link 63 connected at its upper end with bell crank lever 33. A tension spring 64 connects the lower end of said rod with the bottom plate 2 of the machine frame and serves normally to pull downwardly on said rod and thus on the bell crank. The function accordingly of the cam 60 is to raise the bell crank in order to open the clamp for the reception of a blank.

For the purpose of driving shaft 52 and the other operative parts not directly driven, as in the case of the pulley 26 of the hollow cutter and the two lathe pulleys 42, a power shaft 65 and suitable connections are provided. Said power shaft, shown as equipped with a driving pulley 66, is mounted in suitable bearings adjacent one end of frame plate 2 and is connected by a worm 67 and worm gear 68 with a vertical drive shaft 69. Two beveled gears 70 and two spur gears 71 serve to connect such vertical drive shaft with the cam shaft 52 as need not be described in further detail.

The vertical shaft 6 that carries the grip arms 5, as well as the bifurcated arm 15 in the outer end of which is oscillatorily mounted the cam 16, has connected with its lower end a coil spring 72 that normally tends to rotate said shaft and thus the arms in question in a counter-clockwise direction, as viewed in Fig. 1, where such arms appear in the position they occupy at the beginning of their movement in this direction. For the purpose of rotating said shaft in the opposite direction through the necessary arc to carry the blank A to the position where it may be engaged by the clamp arms on slide 30, an eccentric disk 73 is fixedly mounted on said shaft 6 at an intermediate point, such disk being connected by means of a chain 74, or equivalent flexible member, with another eccentric disk 75 rotatably mounted on an adjacent vertical shaft 76. The disposition of such eccentric disks 73 and 75 and of the flexible connection therebetween is such that oscillation of the second disk will produce corresponding oscillation of the first, but in the reverse direction. A sleeve-like extension 77 of said disk 75 carries at its lower end a radial projection or arm 78 that is disposed to be periodically engaged by a disk cam 79 (see Fig. 1) on shaft 69, the effect of such engagement being to rock such arm and thus oscillate the sleeve and parts connected therewith.

Shaft 76 carries at its upper end a dog 80, this being one of the two dogs heretofore referred to as adapted to co-act with the lower rounded end 19 of segment cam 16. The shaft 76 is oscillated to cause dog 80 thus to actuate cam 16 when the grip arms 5 have reached the limit of their movement in a clockwise direction. A coil spring 81, connected with the lower end of shaft 76, serves normally to return the same to its initial or starting position which, as just explained, corresponds with the initial or starting position of shaft 6. The oscillatory movement of shaft 76 in the opposite direction is derived from vertical drive shaft 69 through the medium of a disk 82 mounted thereon and provided with a radial tooth 83 in position to periodically engage a projecting arm 84 on said shaft 76. After said tooth has passed the arm, the shaft is left free to rotate under the impulsion of spring 81 which serves to return it again to its initial position.

The second dog 83 for operating the segment cam 16, in the position of parts shown in Fig. 1, is carried by another vertical shaft 86 which is normally positioned by means of a coil spring 87 just as in the case of the shaft 76 that carries the first dog 80. As in the case of such shaft 76, so shaft 86 is operated from the vertical drive shaft 69 by means of a similar disk 88 thereon which is provided with a radial tooth 89 adapted to periodically engage an arm 90 on the shaft 86 and so oscillate said last mentioned shaft.

Having thus described the construction and operation of the several component parts of my improved machine, the operation of such machine as a whole should be readily apprehended. As shown in Fig. 1, the grip arms 5, although occupying what may be considered to be their starting position, have already been actuated by means of the segment cam 16 to forcibly grip the blank A between the projections 8 of such arms, actuation of the cam having been in turn derived from the oscillatory movement of vertical shaft 76. By reason of the connection between this shaft and shaft 6, the latter moreover has been brought back to such initial position and is now ready to start a fresh counterclockwise movement under the impulsion of spring 72. The latter is the driving force which carries the blank A through the internal rotary cutter and as soon as the blank has been turned by the latter to its proper curved exterior form, it is brought in position to be engaged by the clamp arms on the slide 30 which in the meantime has been advanced for this purpose by cam 53 on cam shaft 52. The clamp arms immediately grip the preliminarily formed blank, the slide thereupon retracted and the blank thus brought into alignment with the lathe heads which finish the ends and drill the hole through the now finished blank. The opening of the clamp arms on the slide allows the blank to drop by gravity. A suitable chute or conveyor (not shown) will of course be provided to carry the finished handle grips away from the machine just as in the case of the supply of blanks to the machine.

While my improved mechanism has been described with particular reference to its adaptability for making a handle grip, it will be understood that the particular use to which the finished article is thus intended to be put is not a limitation upon the field of use of the macihne. On the contrary, the latter may be employed to make any turned article out of wood or similar material which is of the peculiar conformation of such handle grip, i. e. curved longitudinally in addition to being of circular cross section.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of an internal rotary cutter; and an oscillatory blank holder, including relatively movable grip arms adapted to be pressed against the ends of the blank, whereby the latter may be moved in an arcuate path through said cutter.

2. In mechanism of the character described, the combination of an internal rotary cutter; and an oscillatory blank holder, including relatively movable grip arms adapted to be pressed against the ends of the blank, whereby the latter may be moved in an arcuate path through said cutter, said holder-arms being formed with projecting lugs adapted to form recesses of desired form in the ends of the blank.

3. In mechanism of the character described, the combination of a rotary cutter; an oscillatory blank holder, including relatively movable grip arms adapted to be pressed against the ends of the blank, whereby the latter may be moved in an arcuate path past said cutter; a device adapted to clamp the blank intermediately of its ends, said device being movable into and out of the path of travel of said holder-arms on one side of said cutter; and a tool for operating on an end of the blank, said tool being movable transversely of the path of said device.

4. In mechanism of the character described, the combination of a rotary cutter; an oscillatory blank holder, including relatively movable grip arms adapted to be pressed against the ends of the blank, whereby the latter may be moved in an arcuate path past said cutter; a device adapted to clamp the blank intermediately of its ends, said device being movable into and out of the path of travel of said holder-arms on one side of said cutter; and a rotary tool for operating on an end of the blank, said tool being movable transversely of the path of said device.

5. In mechanism of the character described, the combination of a rotary cutter; an oscillatory blank holder, including relatively movable grip arms adapted to be pressed against the ends of the blank, whereby the latter may be moved in an arcuate path past said cutter; a device adapted to clamp the blank intermediately of its ends, said device being movable into and out of the path of travel of said holder-arms on one side of said cutter; a rotary cutting tool for forming an end of the blank; and a drill coaxial with said cutting tool for forming a hole in said blank, said tools being independently movable transversely of the path of said clamping device.

6. In mechanism of the character described, the combination of an internal rotary cutter; and an oscillatory blank holder, including relatively movable grip arms provided with opposed extensions adapted to be pressed against the ends of the blank, such extensions being of sufficient length to alternately project through said cutter in the extreme positions of said holder, respectively.

7. In mechanism of the character described, the combination of an internal rotary cutter; an oscillatory blank holder, including relatively movable grip arms provided with opposed extensions adapted to be pressed against the ends of the blank, such extensions being of sufficient length to alternately project through said cutter in the extreme positions of said holder, respectively; a slide reciprocable in line radial to the axis of oscillation of said holder; a device carried by said slide and adapted to clamp the blank intermediately of its ends, said device in the advanced position of said slide lying in the path of travel of said holder-arms on one side of said cutter; and tools for operating on the respective ends of the blank, said tools being movable transversely of the path of said slide.

8. In mechanism of the character described, the combination of an internal rotary cutter; an oscillatory blank holder, including relatively movable grip arms provided with opposed extensions adapted to be pressed against the ends of the blank, such extensions being of sufficient length to alternately project through said cutter in the extreme positions of said holder, respectively; a slide reciprocable in line radial to the axis of oscillation of said holder; a device carried by said slide and adapted to clamp the blank intermediately of its ends, said device in the advanced position of said slide lying in the path of travel of said holder-arms on one side of said cutter; and rotary tools for forming the respective ends of the blank, said tools being movable transversely of the path of said slide.

9. In mechanism of the character described, the combination of an internal rotary cutter; an oscillatory blank holder, including relatively movable grip arms provided with opposed extensions adapted to be pressed against the ends of the blank, such extensions being of sufficient length to alternately project through said cutter in the extreme positions of said holder, respectively; a slide reciprocable in line radial to the axis of oscillation of said holder; a device carried by said slide and adapted to clamp the blank intermediately of its ends, said device in the advanced position of said slide lying in the path of travel of said holder-arms on one side of said cutter; rotary cutting tools for forming the respective ends of the blank; and a drill coaxial with each such cutting tool, said cutting tools and drills being independently movable transversely of the path of said slide.

10. In mechanism of the character described, the combination of an oscillatory blank-holder, including relatively movable grip arms adapted to be pressed against the ends of the blank, whereby the latter may be moved in an arcuate path; lever members extending rearwardly from said grip arms; and a cam supported for conjoint movement with said holder and capable of independent movement to operate said members.

11. In mechanism of the character described, the combination of an oscillatory blank-holder, including relatively movable grip arms adapted to be pressed against the ends of the blank, whereby the latter may be moved in an arcuate path; lever members extending rearwardly from said grip arms; a cam supported for conjoint movement with said holder and capable of independent movement to operate said members; means for oscillating said holder between predetermined limiting positions; and movable dogs located adjacent such positions and adapted to actuate said cam.

12. In mechanism of the character described, the combination of an oscillatory blank-holder, including relatively movable grip arms adapted to be pressed against the ends of the blank, whereby the latter may be moved in an arcuate path; lever members extending rearwardly from said grip arms; a spring carried by said holder and adapted to force said members together and thereby open said arms; and a segmental cam supported for conjoint movement with said holder and oscillatory between said members to separate the same against said spring.

13. In mechanism of the character described, the combination of an oscillatory blank-holder, including relatively movable grip arms adapted to be pressed against the ends of the blank, whereby the latter may be moved in an arcuate path; lever members extending rearwardly from said grip arms; a spring carried by said holder and adapted to force said members together and thereby open said arms; a segmental cam supported for conjoint movement with said holder and oscillatory between said members to separate the same against said spring; means for oscillating said holder between predetermined limiting positions; and movable dogs located adjacent such positions and adapted to actuate said cam.

Signed by me, this 15 day of October, 1923.

GEORGE W. BENTON.